United States Patent [19]

Flader et al.

[11] 4,280,758

[45] Jul. 28, 1981

[54] VERTICALLY ADJUSTABLE BIFOCAL EYE GLASSES

[75] Inventors: Tom R. Flader, Rte. 2, 4116 Meiklejohn Rd., Fond du Lac, Wis. 54935; Don A. Ellis, New Berlin, Wis.

[73] Assignee: Tom R. Flader, Fond du Lac, Wis.

[21] Appl. No.: 71,060

[22] Filed: Aug. 30, 1979

Related U.S. Application Data

[63] Continuation-in-part of Ser. No. 956,914, Nov. 2, 1978, abandoned.

[51] Int. Cl.³ .................. G02C 7/06; G02C 1/00; G02C 5/12; G02C 5/04
[52] U.S. Cl. .................................. 351/55; 351/88; 351/128; 351/137
[58] Field of Search .................. 351/55, 76, 77, 88, 351/128, 137, 57, 58

[56] References Cited

U.S. PATENT DOCUMENTS

| 1,102,909 | 7/1914 | Hannah | 351/55 |
|---|---|---|---|
| 2,252,922 | 8/1941 | Goldstein . | |
| 2,410,141 | 10/1946 | Zell . | |
| 2,660,924 | 12/1953 | Stegeman . | |
| 2,670,658 | 3/1954 | Grantham | 351/55 |
| 3,365,263 | 1/1968 | Allen . | |
| 3,552,838 | 1/1971 | Hawks . | |
| 4,113,365 | 9/1978 | Koketsu . | |

*Primary Examiner*—John K. Corbin
*Assistant Examiner*—Rodney B. Bovernick
*Attorney, Agent, or Firm*—Michael, Best & Friedrich

[57] ABSTRACT

The eyeglasses include a pair of rims carrying bifocal lenses and interconnected by a bridge to define a nose-receiving space therebetween and further includes a nose piece, mounted between the rims, either as an integral part of the bridge or as part of a separate, detachable unit. The nose piece is connected to a push-push mechanism which is arranged so that a wearer, with the nose piece resting on his nose, can conveniently move the lenses up and down between a normal position and raised a position where the lower reading portions of the lenses are in front of the eyes by simply applying a momentary downward force on the bridge, the rims or the temple pieces.

13 Claims, 12 Drawing Figures

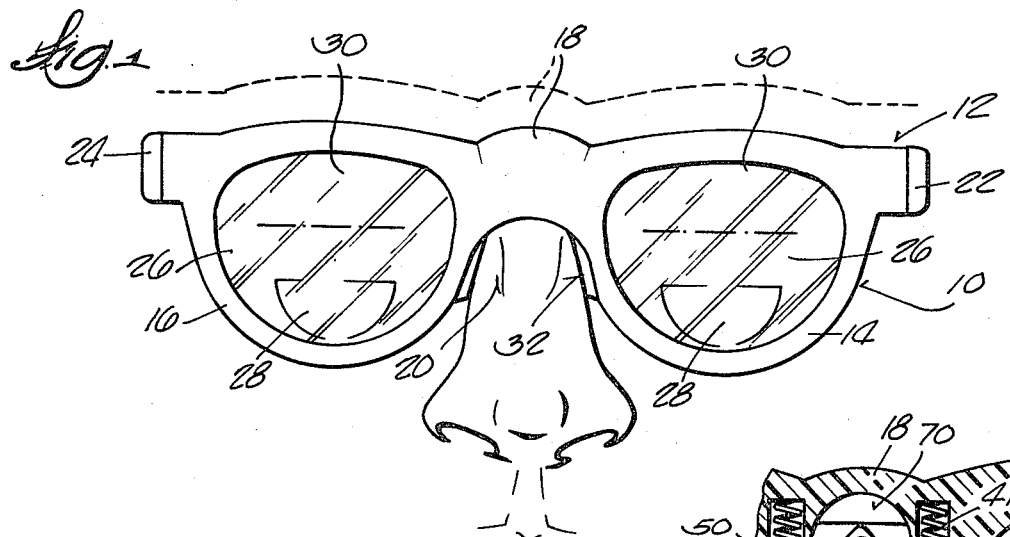
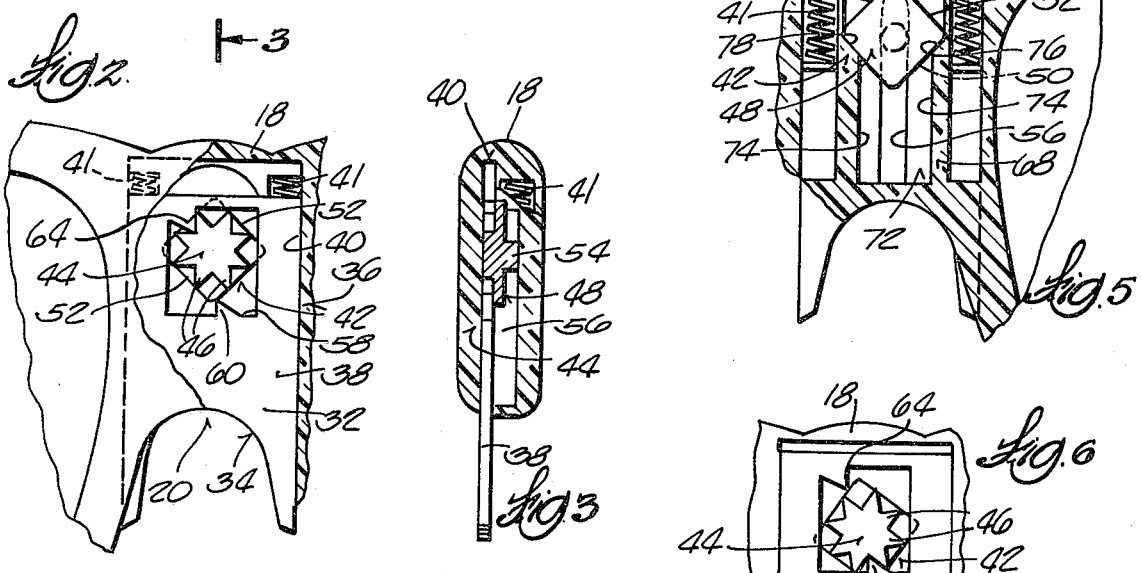
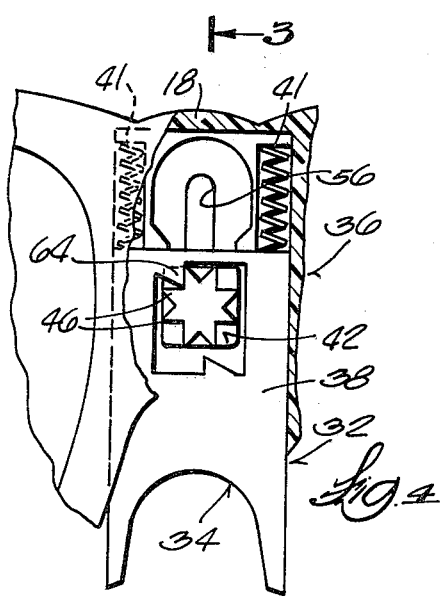
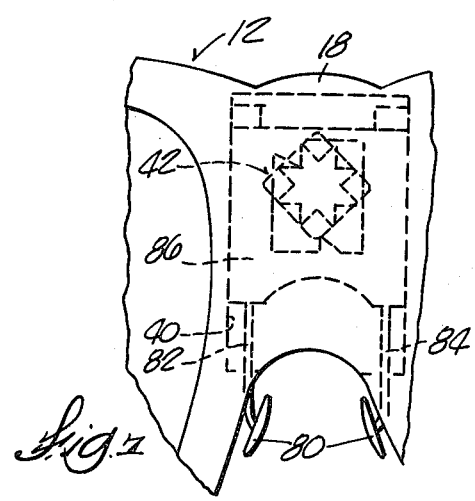

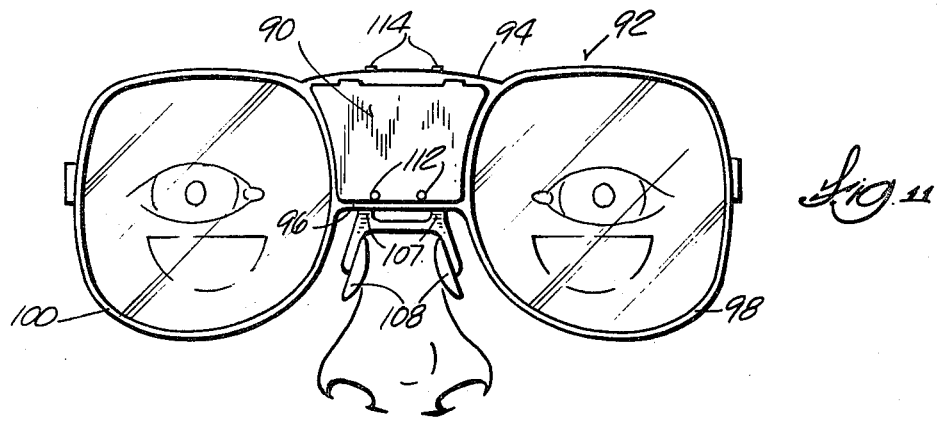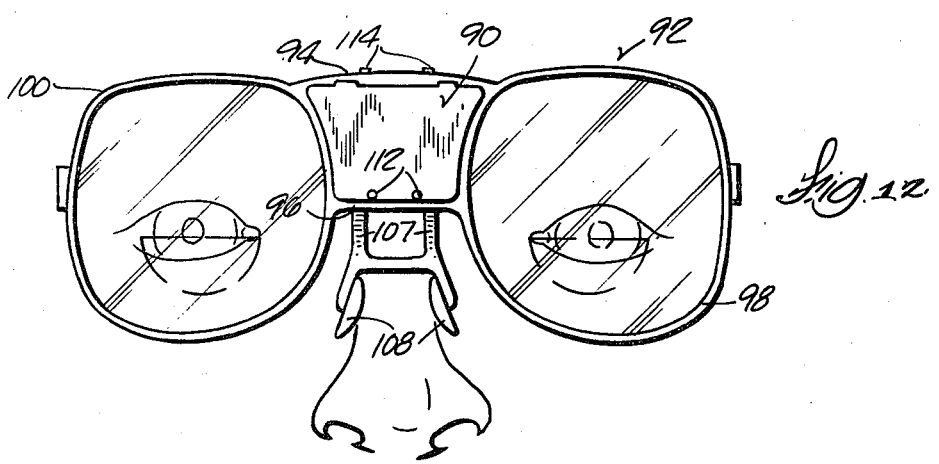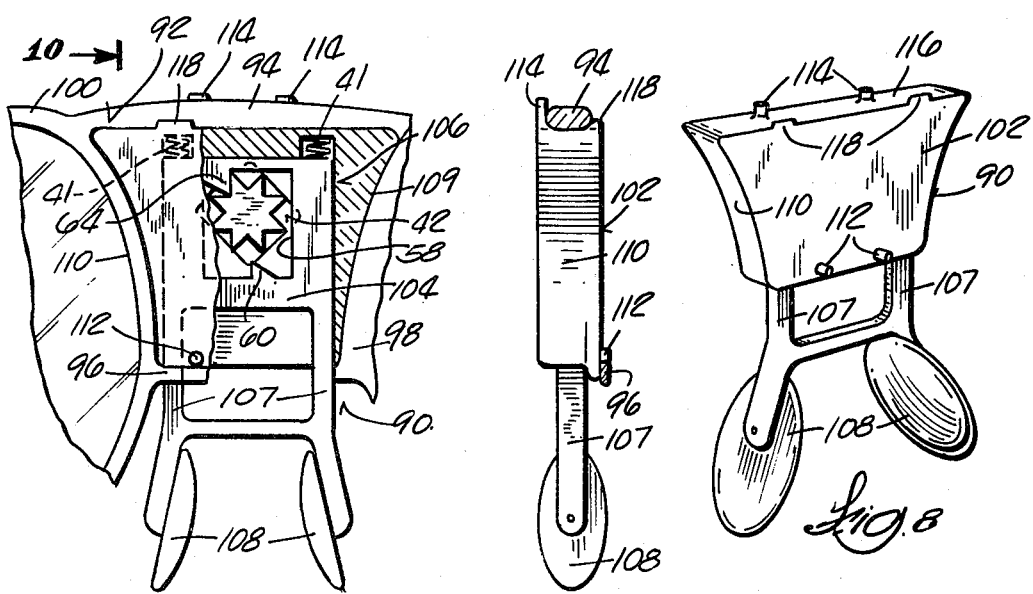

VERTICALLY ADJUSTABLE BIFOCAL EYE GLASSES

CROSS REFERENCE TO RELATED APPLICATION

This application is a continuation-in-part of application Ser. No. 956,914, filed on Nov. 2, 1978 now abandoned.

BACKGROUND OF THE INVENTION

This invention relates to eyeglasses and, more particularly, to vertically adjustable bifocal eyeglasses.

Bifocal lenses for eyeglasses include a lower or reading portion and an upper or long distance portion. A wearer usually looks downwardly through the lower portion when reading or viewing an object close to the eyes and looks straight ahead or upwardly through the upper portion when viewing more distant objects. When the wearer wishes to read something at or above eye level without removing his eyeglasses, he must either tilt his head backwards to an uncomfortable position or raise the eyeglasses frame to permit reading through the lower portions of the lenses.

It is known that this problem can be alleviated by providing the eyeglasses frame with a vertically adjustable nose piece or bridge which is arranged for selectively raising the lenses to a position where the lower portions of the lenses are in a normal line of sight with the object being viewed or the material being read. Prior art arrangements of this type are exemplified in U.S. Pat. Nos. 2,252,922, 2,410,141, 2,486,881, 2,660,924, 3,365,263, 3,552,830, and 4,113,365. The arrangements disclosed in these patents have one or more shortcomings such as vertical adjustment in both directions cannot be conveniently made without at least partically removing the eyeglasses and/or using both hands, asthetically unattractive parts are conspicuous, particulary when the lenses are in a raised position, and the cost of manufacture is relatively high. U.S. Pat. Nos. 1,102,909 and 2,670,658 disclose arrangements which permit vertical adjustment with the frame in place; however, movement of a small catch, knob on the like with one or more fingers is required.

SUMMARY OF THE INVENTION

A principal object of the invention is to provide bifocal eyeglasses including means for adjusting the position of the lenses arranged so that a wearer, without removing the eyeglasses, can conveniently and quickly move the lenses up and down between a normal position and a raised position where the lower reading portions thereof are in front of the eyes.

Another object of the invention is to provide such eyeglasses wherein the mechanism for effecting the vertical adjustment of the lenses is an integral part of the frame.

A further object of the invention is to provide a removable auxiliary nose piece for bifocal eyeglasses including means which is operable to move the lenses between normal and raised positions by simply applying a momentary downward force on the eyeglasses frame.

Other objects, aspects and advantages of the invention will become apparent to those skilled in the art upon reviewing the following detailed description, the drawings and the appended claims.

The invention provides a vertically movable nose piece which is mounted on the eyeglasses frame in the nose-receiving area between the lenses, either as an integral part of a bridge interconnecting rims carrying the lenses or as part of a separate unit adapted to be detachably mounted on the eye glasses frame between the rims, and a push-push mechanism operably connected to the nose piece. The push-push mechanism is operable to afford reciprocative vertical movement of the frame, and thus the lenses, between a normal position and a raised position in response to the application of a momentary downward force on the frame with the nose piece resting on the wearer's nose and to releasably hold the frame in the position to which it is moved.

In a preferred embodiment, the push-push mechanism includes a slider element having a lower portion forming the nose piece, means mounting the slider element for reciprocative vertical movement of the eyeglasses frame relative to the slider element, bias means bearing against the slider element for urging the frame towards the raised position, and a catch or latch cooperating with the slider element to provide the selective vertical movement and releasable holding action described in the preceding paragraph.

BRIEF DESCRIPTION OF THE DRAWING

FIG. 1 is a front elevational view of a pair of bifocal eyeglasses embodying the invention.

FIG. 2 is a fragmentary enlarged view, partially broken away, illustrating the location of the push-push mechanism parts when the eyeglasses frame is in the normal position.

FIG. 3 is a sectional view taken generally along line 3—3 in FIG. 2.

FIG. 4 is a view similar to FIG. 2 illustrating the location of the push-push mechanism parts when the eyeglasses frame is in the raised position.

FIG. 5 is a view similar to FIG. 4 with some of the push-push mechanism parts removed to facilitate illustration of other parts.

FIG. 6 is a view similar to FIG. 4 illustrating the location of the push-push mechanism parts at the time a downward position-changing force has been applied on the bridge and prior to release of that force.

FIG. 7 is a partial front elevational view of an alternate construction for the nose-engaging member.

FIG. 8 is an enlarged perspective view of a separate, removable unit incorporating the push-push mechanism of the invention and particularly adaptable for use with wire rim type frames.

FIG. 9 is an enlarged fragmentary, front elevational view of a pair of wire rim bifocal eyeglasses with a unit of FIG. 8 installed and partially broken away to illustrate location of the push-push mechanism parts when the frame is in the normal position.

FIG. 10 is a sectional view taken generally along line 9—9 in FIG. 9.

FIG. 11 is a front elevational view of a pair of wire rim bifocal eyeglasses with a separate unit installed and the nose piece in the normal position.

FIG. 12 is a view similar to FIG. 11 with the nose piece in the raised position after application and release of a position-changing force has been applied on the bridge.

DESCRIPTION OF THE PREFERRED EMBODIMENTS

Illustrated in FIG. 1 is a pair of eyeglasses 10 including a frame 12 having a pair of lens rims 14 and 16, a bridge 18 interconnecting the rims 14 and 16 to define a nose-receiving space 20, and a pair of temple pieces 22 and 24 hingedly mounted on the outer edge of a respective rim 14 and 16 in the usual manner. Each of the rims 14 and 16 carry a bifocal lens 26 having a lower portion 28 for reading or close-up vision and an upper portion 30 for distant vision.

Disposed adjacent the nose-receiving space 20 (FIGS. 2 and 4) is a nose piece 32 having a bottom portion 34 contoured to rest on a wearer's nose. The nose piece 32 is slidably mounted on the bridge 18 so that the frame 12, and thus the lenses 26, can be moved vertically relative to the nose piece 32 between a normal or lowered position illustrated by the solid lines in FIG. 1 wherein the lenses 26 are located for normal use and a raised position illustrated by the dashed lines in FIG. 1 wherein the lower portions 28 of the lenses 26 are located directly in front of the wearer's eyes.

The nose piece 32 is connected to the bridge 18 through a push-push mechanism 36 which is arranged to provide vertical movement of the frame 12 between the normal and raised positions in response to the application of a momentary downward force on the frame 12 with the nose piece 32 resting on the wearer's nose. The push-push mechanism 36 also releasably holds the frame 12 in the position to which it has been moved until a position-changing force is again applied thereon. The wearer can apply this position-changing force by pushing downwardly on the bridge 18 with a finger, by grasping one or both of the rims 14 and 16 and pushing them downwardly, or by grasping one or both of the temple pieces 22 and 24 and pushing them downwardly.

Various suitable push-push mechanisms capable of providing the above-described action can be used. In the preferred construction illustrated in FIGS. 2-6, the push-push mechanism 36 includes a slider element 38 having a bottom or lower portion including a nose-engaging portion 34 and a top or upper portion. The upper portion of the slider element 38 is slidably received in an internal recess 40 provided in the bridge 18 for reciprocative vertical movement of the frame 12 relative to the slider element 38 between the normal position shown in FIG. 2 and the raised position shown in FIG. 4. A travel of the frame 12 relative to the slider element 38 in the order of about 3/16 inch during movement between positions usually is sufficient. The frame 12 is biased toward the raised position by a pair of small springs 41 disposed inside the bridge 18 and bearing against the slider element 38.

Mounted in the recess 40 for both rotational and vertical movement relative to the bridge 18 is a latch member 42 which serves as a catch or latch for releasably holding the frame 12 in the raised and lowered positions as described below. One face or side 44 of the latch member 42 includes a plurality (e.g., 8) of circumferentially spaced, gear-like teeth 46. As best shown in FIG. 5 in which the slider element 38 and the toothed side 44 of the latch member 42 has been removed, the opposite side or face 48 of the latch member 42 has a rectangular or square shape and opposed, generally flat edges 50 and 52. Extending from the square side 48 of the latch member 42 (FIGS. 3 and 5) is a pivot pin 54 which rides in a narrow vertical groove 56 (FIGS. 4 and 5) provided in the bridge 18.

The toothed side 44 of the latch member 42 extends through an opening 58 in the upper portion of the slider element 38. A cam projection 60 provided on the lower edge of the opening 58 engages a latch member tooth 46 as shown in FIG. 6 and rotates the latch member 42, in a counterclockwise direction as viewed in FIGS. 2, 4 and 5, during downward movement of the bridge 18 relative to the slider element 38 when a position-changing force is applied on the frame. A pawl projection 64 provided on the upper edge of the opening 58 engages a latch member tooth 46 as shown in FIGS. 2 and 4 and serves as a detent for permitting further limited rotation of the latch member 42 after the position-changing force has been released.

The square side 48 of the latch member 42 is slidably received in a vertically extending channel 68 provided in the bridge 18. As best shown in FIG. 5, the channel 68 includes an enlarged upper portion 70 which permits free rotation of the square side 48 of the latch member 42 and an elongated lower portion 72 having opposed, generally parallel side walls 74. The lower portion 72 of the channel 68, in cooperation with the square side 48 of the latch member 42, guides vertical movement of the frame 12 relative to the nose piece 32 between the normal and raised positions when the latch member 42 has been rotated to an unlatching position. As shown in FIG. 4, when the latch member 42 is in an unlatching position, the opposed edges of the square side 48 are aligned with the lower portion 72 of the channel, i.e., are parallel to the channel side walls 74.

When a position-changing force is applied on the frame 12 to move the lenses 26 from the raised position (FIG. 4) to the normal position (FIG. 2), the cam projection 60 engages a latch member tooth 46 and downward movement of the frame 12 relative to the nose piece 32 is guided by the square side 48 of the latch member 42 until the enlarged portion 70 of the channel 68 reaches the latch member 42. The cam projection 60 then rotates the latch member 42 in the counterclockwise direction to a cocked or latching position shown in FIG. 6 wherein the edges 50 and 52 of the square side 48 are at an angle to the channel side walls 74 and the square side 48 of the latch member 42 cannot enter the lower portion 72 of the channel 68.

Upon subsequent release of the position-changing force on the frame 12, the springs 41 urge the frame 12 upwardly relative to the slider element 38. The pawl projection 64 engages a latch member tooth 46 and further rotates the latch member in the counterclockwise direction until engaged by the next tooth. The total rotation of the latch member during a position change is 45° when the latch member has 8 teeth as illustrated. As shown in FIGS. 2 and 4, the pawl projection 64 serves as a detent for preventing further rotation of the latch member 42 until a position changing force is subsequently applied on the frame 12. The adjacent edges 50 and 52 of the square side 48 of the latch member 42 (FIG. 5) are eventually seated by the springs 41 against converging walls 76 and 78 connecting the enlarged portion 70 and the lower portion 72 of the channel 68 and the frame 12 is thereby releasably held in the normal position.

When a position-changing force is subsequently applied on the frame 12 for movement back to the raised position, the latch member 42 is moved downwardly in the slider element opening 58 away from the pawl projection 64 and a tooth 46 eventually engages the cam projection 60. During continued downward movement of the bridge 18 relative to the slider element, 38, the cam projection 60 rotates the latch member 42 counterclockwise to an unlatching position wherein, upon subsequent release of the position-changing force and initial upward movement of the frame 12 by the springs 41, the pawl projection 64 engages a latch member tooth 46 and further rotates latch member 42 in a counterclockwise direction until engaged by the next tooth. The pawl projection 64 then detains or holds the latch member 42 with the edges 50 and 52 of the square side 48 aligned with the lower portion 72 of the channel 68, thereby permitting the springs 41 to move the frame 12 to the raised position as shown in FIG. 6.

In the alternate construction illustrated in FIG. 7, a pair of laterally spaced nose pads 80 are rockably mounted on individual arms 82 and 84 secured to the lower end of the slider element 86. The other components of the push-push mechanism otherwise are arranged and operate in the manner described above. The slider element 86 preferably is arranged so that it is not visible from the front, even when the frame 12 is in the raised position. This can be accomplished by shortening the slider element 86 so that the lower end is retracted inside the bridge 18 when in the normal position and contouring the bottom end of the slider element as shown so that it does not extend beyond the lower edges of the bridge when in the raised position. Vertical grooves (not shown) can be provided in the back side of the bridge 18 for accommodating the upper ends of the arms 82 and 84 when the slider element 86 is retracted to the normal position.

From the above description, it can be seen that the wearer can conveniently and quickly move the lenses up and down between a normal position and a raised position by simply applying a momentary downward force on the bridge, rims or temple pieces.

The embodiments illustrated in FIGS. 1-7 are particularly adaptable for eye glasses frame constructed from synthetic plastic materials. The recess 40, channel 68, and groove 56 can be formed into the back side of the bridge during the molding operation and the recess covered by a cover plate suitably secured to the back side of the bridge after the latch member 42, the springs 41 and the slider element 38 or 86 have been assembled in the recess 40. The latch member and slider element preferably are constructed from a synthetic plastic material to minimize cost, weight and wear. If the frames are made from an opaque material, the push-push mechanism is not visible from the front when the lenses are in the normal position with either of the above-described embodiments and only a portion of the slider element in the embodiment illustrated in FIGS. 2-6 is visible when the lenses are in the raised position. The visible portion of the slider element can be made less conspicuous by constructing it from a material having the same color as the frames.

FIGS. 8-11 illustrate another embodiment comprising a separate unit 90 which can be detachably mounted on wire rimmed frames 92 having a bridge formed by a pair of parallel-spaced cross members 94 and 96 interconnecting lens rims 98 and 100. If the unit is used on commercially available frames, the existing nose pads must be removed prior to mounting.

The unit 90 (FIGS. 8 and 9) includes a housing 102 slidably receiving the upper end of slider element 104 and enclosing a push-push mechanism 106 which is arranged and operates in the same basic manner as the push-push mechanism described above. Accordingly, common parts are identified by the same reference numerals and a detailed description of the push-push mechanism is not necessary to fully understand this embodiment. Depending from the lower end of the slider element 104 is a pair of legs 107, each carrying a nose pad 108.

The housing 102 is arranged to fit into and fully occupy the space defined between the cross members 94 and 96 and the lens rims 98 and 100 after the existing nose pads have been removed. In this regard, the opposite edges 109 and 110 of the housing 102 are contoured to fit against the inside edges of the lens rims 98 and 100.

Means are provided on the housing 102 for detachably mounting the unit 90 on the frame 92. While various suitable means can be used for this purpose, in the specific construction illustrated, a detention lug/snap-in arrangement is provided on the housing. This arrangement includes a pair of laterally spaced lugs 112 on the front and near the bottom edge of the housing 102, a pair of laterally-spaced lugs 114 on the rear portion of the top edge 116 of the housing and a pair of laterally-spaced, snap-in projections 118 on the front portion of the top edge 116 of the housing. As best shown in FIG. 10, the lower lugs 112 are adapted to bear against the top edge of the lower cross member 96, the upper lugs 114 are adapted to bear against the back edge of the upper cross member 94 and the projections 118 are adapted to snap-in under the upper cross member 94.

For installation, the unit 90 is installed from the rear of the frame as viewed in the drawings. The lower end of the housing 102 is moved into place with the lower lugs 112 resting on the top edge of the lower cross member 96. The top edge of the housing is then pushed forwardly so that the projections 118 cam the upper cross member 94 upwardly and passes thereunder. When the upper cross member 94 thereafter returns to its normal position, it is locked between the lugs 114 and the projections 118 and engages the top edge 116 of the housing. For removal, the upper cross member 94 is flexed upwardly far enough to permit the projections 118 to pass thereunder as the top portion of the housing is tilted rearwardly.

When in place with the nose pads 108 resting on the wearer's nose, the frame can be moved between a normal position shown in FIG. 11 to the raised position shown in FIG. 12 by simply pressing downwardly on the upper cross member 94 with a finger and then releasing, the push-push mechanism operating in the same manner as described above.

The housing 102 and slider element 104 preferably are made from a synthetic plastic material. The exterior surfaces of the housing 102, the slider element 104, and the legs 107 preferably are coated with a paint or the like of the same color as the frames to enhance the esthetic appearance.

The units 90 can be supplied as kits for mounting on existing frames by providing a variety of housings having the appropriate shape to fit on different frames. As mentioned before, the nose pads of the existing frames are removed prior to installation of the unit. If desired, the unit 90 can be conveniently removed and the existing nose pads replaced when the eyeglasses are to be used for a purpose which does not require repeated shifting between the upper and lower portions of the lenses. Also, the units can be arranged for mounting on the back side of the bridge of heavier plastic frames.

While the preferred embodiments of the invention have been described and illustrated in detail, it should be understood that various modifications and alterations can be made thereto without departing from the spirit and scope of the invention.

We claim:

1. An eyeglasses frame including
   a pair of rims, each adapted to carry a bifocal lens;
   a bridge interconnecting said rims;
   a nose piece adapted to rest on a wearer's nose;
   a push-push mechanism carried by said bridge and operably connected to said nose piece, said mechanism being operable to afford reciprocative vertical movement of said frame relative to said nose piece between a normal position and a raised position and to releasably hold said frame in the position to which it is moved in response solely to the application of a momentary downward force on said frame with said nose piece resting on the wearer's nose.

2. An eyeglasses frame according to claim 1 wherein said nose piece includes a bottom portion contoured to fit on the wearer's nose.

3. An eyeglasses frame according to claim 1 wherein said nose piece includes a pair of laterally spaced nose pads on the bottom portion thereof.

4. An eyeglasses frame according to claim 1 wherein said push-push mechanism includes
   a slider element having an upper portion and a lower portion including said nose piece
   means mounting said slider element on said bridge for reciprocative vertical movement of said bridge relative to said slider element;
   bias means bearing against said slider element for urging said frame toward the raised position; and
   a catch carried by said bridge and cooperating with said slider element for permitting movement of said frame from one position to the other and releasably holding said frame in the other position upon the application and subsequent release of a downward force on said frame.

5. An eyeglasses frame according to claim 4 wherein said catch includes
   a latch member carried by said bridge for both rotational and vertical movement relative to said bridge, one side of said latch member including a plurality of circumferentially spaced, gear-like teeth;
   a cam on said slider element for engaging a tooth on said latch member and rotating said latch member in response to the application of a position-changing force on said frame;
   detent means on said slider element for engaging another tooth on said latch member and releasably preventing rotation of said latch member after the position-changing force has been released; and
   stop means on said bridge and on said latch means for limiting upward vertical movement on said frame relative to said slider element after a position-changing force for moving said frame from the raised position to the normal position has been released.

6. An eyeglasses frame according to claim 5 wherein said slider element includes an opening in the upper portion thereof receiving the toothed side of said latch member and having opposed upper and lower edges;
   said cam is a cam-shaped projection on the lower edge of said slider element opening; and
   said detent means is a pawl-shaped projection on the upper edge of said slider element opening, said projections being spaced far enough apart to permit free rotation of the toothed side of said latch member within said opening.

7. An eyeglasses frame according to claim 6 wherein said stop means includes
   the opposite side of said latch member having a rectangular shape with opposed, generally flat edges; and
   means defining a vertically extending channel slidably receiving the opposite side of said latch member, said channel including an enlarged upper portion which permits rotation of the opposite side of said latch member relative to said bridge and an elongated lower portion extending from said enlarged portion and having opposed, generally parallel side walls for permitting and guiding vertical movement of said bridge between the normal and raised positions when said latch member has been rotated to an unlatching position wherein opposed edges of the opposite side thereof are substantially parallel to said sidewalls and for preventing vertical movement of said bridge from the normal position to the raised position when said latch member has been rotated to a latching position wherein said edges are at an angular relationship to said sidewalls.

8. An eyeglasses frame according to claim 7 wherein said enlarged portion of said channel includes a pair of converging walls against which the adjacent edges of the opposite side of said latch member are urged by said biasing means when said latch member is in the latching position.

9. An eyeglasses frame including
   a pair of rims, each adapted to carry a bifocal lens;
   a bridge interconnecting said rims;
   a nose piece having a lower portion adapted to rest on a wearer's nose and an upper portion slidably mounted in a recess in said bridge for reciprocative vertical movement of said frame relative to said nose piece between a normal position and a raised position; and
   a push-push mechanism connecting said nose piece with said bridge including
   bias means acting against said nose piece for urging said frame toward the raised position;
   a latch member carried by said bridge for both rotational and vertical movement relative to said bridge, one side of said latch member including a plurality of circumferentially spaced, gear-like teeth and the opposite side having a rectangular shape with opposed, generally flat edges,
   an opening in the upper portion of said nose piece receiving the toothed side of said latch member and having opposed upper and lower edges,
   a cam projection on the lower edge of said opening for engaging a tooth on said latch member and rotating said latch member in response to a downward force applied on said frame against the biasing force of said bias means with said nose piece resting on the wearer's nose;
   a pawl projection on the upper edge of said opening for engaging another tooth on said latch member and releasably preventing rotation of said latch member after the downward force has been released and said bias means returns said bridge toward the raised position; and
   a vertically extending channel on said recess slidably receiving the opposite side of said latch member, said channel including an enlarged upper portion which permits rotation of the opposite side of said latch member relative to said bridge and an elongated lower portion having opposed, generally parallel sidewalls for permitting and guiding vertical movement of said frame between the normal and raised positions when said latch member has been rotated to an unlatching position wherein opposed edges of the opposite side thereof are substantially parallel to said sidewalls and for preventing vertical movement of said frame from the normal position to the raised position when said latch member has been rotated to a latching position wherein said edges are at an angular relationship to said sidewalls.

10. A detachable nose piece for bifocal eyeglasses including a frame having a pair of rims carrying bifocal lenses and interconnected by a bridge to define a nose-receiving space therebetween, said nose piece including a housing adapted to be detachably mounted on said frame in the nose-receiving space;

a nose-engaging member having one end adapted to rest on the wearer's nose and an opposite end portion slidably mounted on said housing for relative vertical movement; and a push-push mechanism in said housing operably connected to said nose-engaging member, said mechanism being operable, when said housing is mounted on said frame, to afford reciprocative vertical movement of said frame relative to said nose-engaging member between a normal position and a raised position and to releasably hold said frame in the position to which it is moved in response solely to the application of a momentary downward force on said frame with said nose-engaging member resting on the wearer's nose.

11. A nose piece according to claim 10 wherein said push-push mechanism includes a slider element including said nose-engaging member;

means mounting said slider element in said housing for reciprocative vertical movement of said housing relative to said slider element;

bias means bearing against said slider element for urging said housing, and thus said frame, toward the raised position;

a latch member carried by said housing for both rotational and vertical movement relative to said housing, one side of said latch member including a plurality of circumferentially spaced, gear-like teeth;

a cam on said slider element for engaging a tooth on said latch member and rotating said latch member in response to the application of a position-changing force on said frame;

detent means on said slider element for engaging another tooth on said latch member and releasably preventing rotation of said latch member after the position-changing force has been released; and stop means on said housing and on said latch means for limiting upward vertical movement on said frame relative to said slider element after a position-changing force for moving said frame from the raised position to the normal position has been released.

12. A nose piece according to claim 11 wherein said slider element includes an opening in the upper portion thereof receiving the toothed side of said latch member and having opposed upper and lower edges;

said cam is a cam-shaped projection on the lower edge of said slider element opening; and said detent means is a pawl-shaped projection on the upper edge of said slider element opening, said projections being spaced far enough apart to permit free rotation of the toothed side of said latch member within said opening.

13. A nose piece according to claim 12 wherein said stop means includes the opposite side of said latch member having a rectangular shape with opposed, generally flat edges; and means in said housing defining a vertically extending channel slidably receiving the opposite side of said latch member, said channel including an enlarged upper portion which permits rotation of the opposite side of said latch member relative to said housing and an elongated lower portion extending from said enlarged portion and having opposed, generally parallel side walls for permitting and guiding vertical movement of said frame between the normal and raised positions when said latch member has been rotated to an unlatching position wherein opposed edges of the opposite side thereof are substantially parallel to said side walls and for preventing vertical movement of said frame from the normal position to the raised position when said latch member has been rotated to a latching position wherein said edges are at an angular relationship to said sidewalls.

* * * * *